(12) United States Patent
Lee et al.

(10) Patent No.: US 10,630,830 B2
(45) Date of Patent: Apr. 21, 2020

(54) MICROPHONE SWITCHING METHOD AND ELECTRONIC DEVICE USING SAME

(71) Applicant: Chiun Mai Communication Systems, Inc., New Taipei (TW)

(72) Inventors: Hsiao-Yuan Lee, New Taipei (TW); Chun-Jen Chen, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 0 days.

(21) Appl. No.: 15/455,048

(22) Filed: Mar. 9, 2017

(65) Prior Publication Data

US 2017/0264734 A1 Sep. 14, 2017

(30) Foreign Application Priority Data

Mar. 10, 2016 (CN) .......................... 2016 1 0135096

(51) Int. Cl.
*H04M 1/725* (2006.01)
*H04M 1/60* (2006.01)
*H04W 4/02* (2018.01)

(52) U.S. Cl.
CPC ..... *H04M 1/72569* (2013.01); *H04M 1/6008* (2013.01); *H04M 1/6041* (2013.01); *H04W 4/026* (2013.01); *H04M 2250/12* (2013.01)

(58) Field of Classification Search
CPC ....... H04W 4/012; H04W 4/026; H04M 1/02; H04M 1/0206–0287; H04M 2250/12; H04M 1/72569; H04M 1/72519; H04M 2250/52; H04M 1/6041; H04M 1/72577; H04M 1/57

USPC ........................................... 455/575.1–575.8
See application file for complete search history.

(56) References Cited

U.S. PATENT DOCUMENTS

| 2009/0325644 | A1* | 12/2009 | Tseng ................. | H04M 1/0202 455/566 |
| 2012/0235963 | A1* | 9/2012 | Oshinome ................ | G09G 5/00 345/204 |
| 2012/0286943 | A1* | 11/2012 | Rothkopf ................ | G08B 6/00 340/407.1 |
| 2013/0222231 | A1* | 8/2013 | Gardenfors ........... | G06F 1/1626 345/156 |

FOREIGN PATENT DOCUMENTS

| CN | 101998693 A | 3/2011 |
| CN | 104320527 A | 1/2015 |
| CN | 104699391 A | 6/2015 |
| TW | 201013168 A | 4/2010 |

* cited by examiner

*Primary Examiner* — Allahyar Kasraian
(74) *Attorney, Agent, or Firm* — ScienBiziP, P.C.

(57) ABSTRACT

An electronic device includes a first microphone, a second microphone, a sensing unit, and a control unit. The first and second microphones are respectively positioned at two different sides of the electronic device. The sensing unit is configured to sense a first light value of a first side of the electronic device, a second light value of a second side of the electronic device and an orientation of the electronic device. The control unit is configured to select one of the first microphone and the second microphone to work according to the first and second light values and the orientation of the electronic device.

8 Claims, 5 Drawing Sheets

MICROPHONE SWITCHING METHOD AND ELECTRONIC DEVICE USING SAME

FIELD

The disclosure generally relates to microphone switching methods, and particularly to a microphone switching method used in electronic device such as a mobile phone.

BACKGROUND

A typical mobile phone includes two microphones. Commonly, one of the microphones is positioned at a lower end of the mobile phone and configured to receive audio signals from a user when the mobile phone is in a normal mode during calls. Another microphone is positioned on a rear cover of the mobile phone and configured to receive the audio signal from the user when the mobile phone is in a hand-free mode during calls. However, when the mobile phone is placed on a desk with a screen facing upwards, the microphone positioned on the rear cover may be blocked and cannot effectively and stably receive the audio signals due to blocking. That may cause problem of volume and quality of the calls.

BRIEF DESCRIPTION OF THE DRAWINGS

Many aspects of the present disclosure can be better understood with reference to the drawings. The components in the drawings are not necessarily drawn to scale, the emphasis instead being placed upon clearly illustrating the principles of the disclosure. Moreover, in the drawings, like reference numerals designate corresponding parts throughout the views.

DETAILED DESCRIPTION

Figure 1:
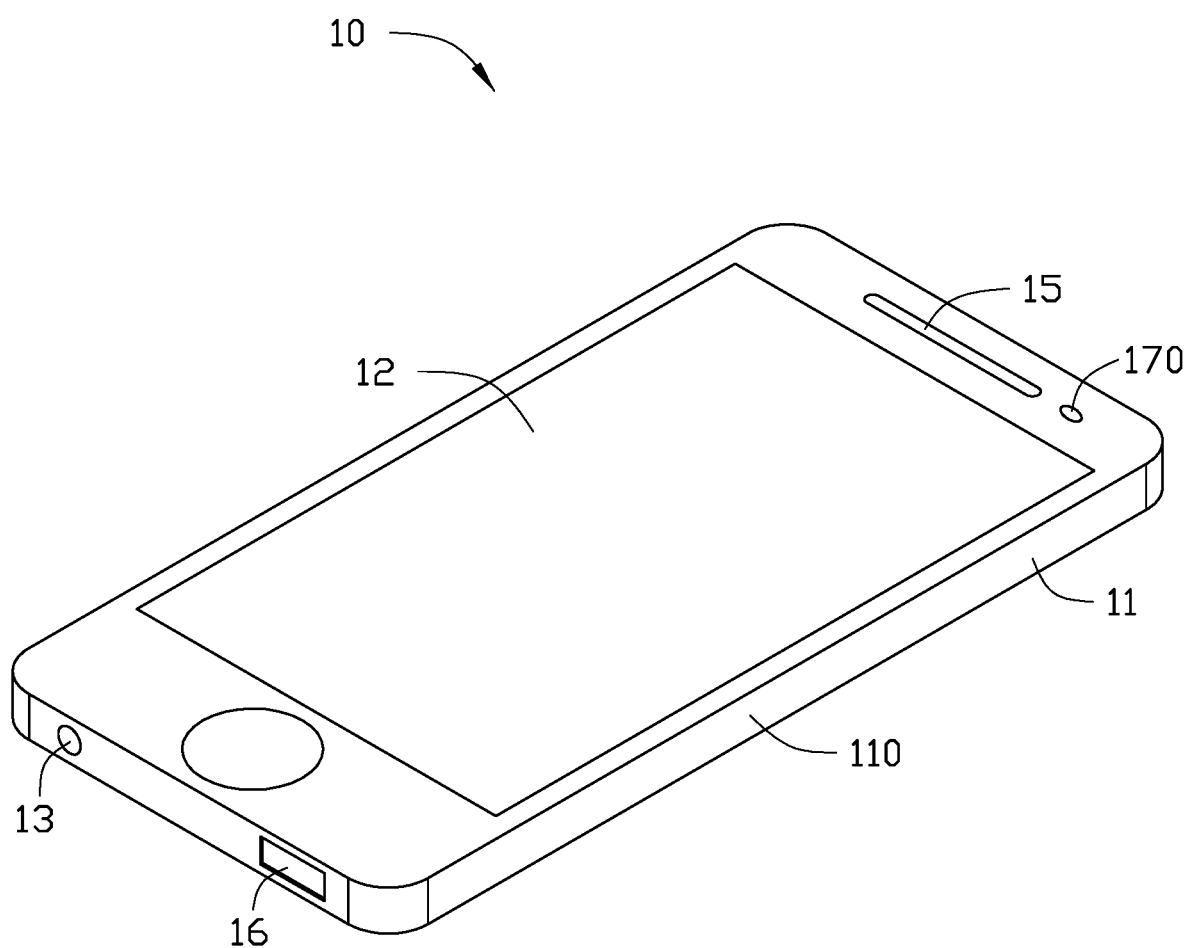
FIG. 1 is schematic, isometric view of one embodiment of an electronic device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiment described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Figure 2:
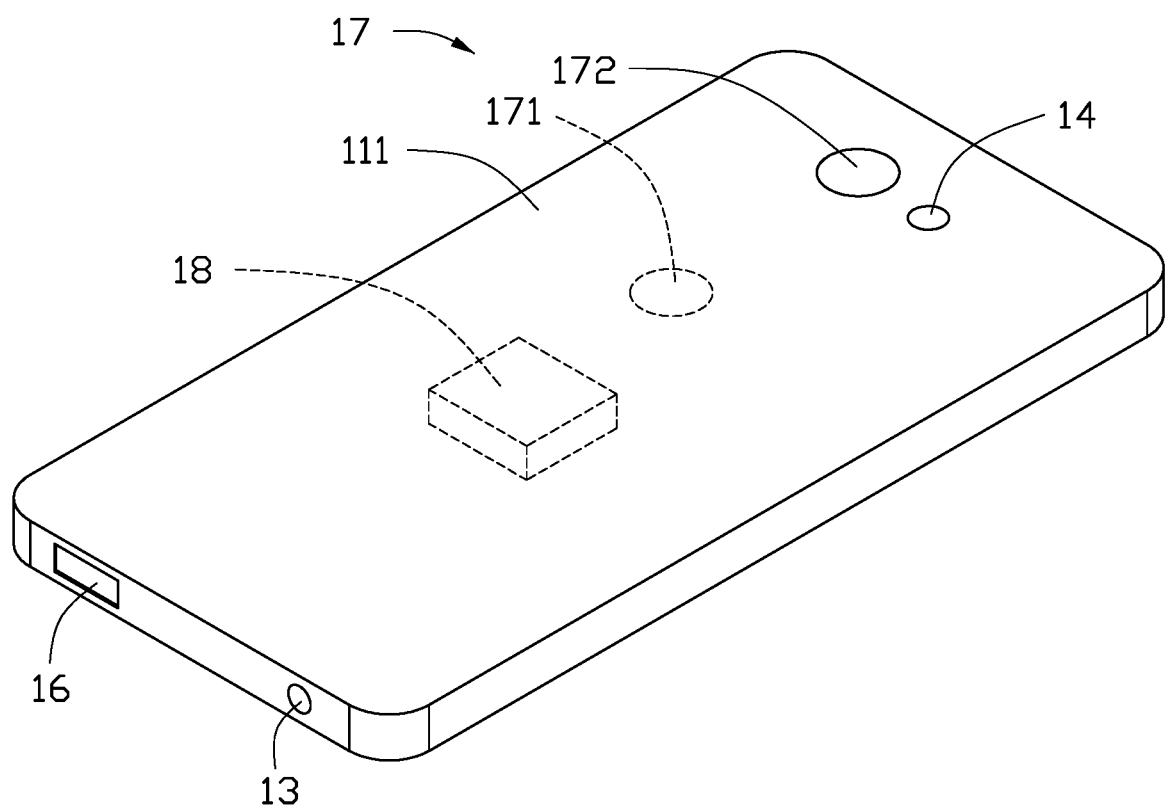
FIG. 2 is substantially similar to FIG. 1, but shown from another aspect.

FIGS. 1 and 2 show schematic, isometric view of one embodiment of an electronic device. The electronic device 10 includes a main body 11, a screen 12, a first microphone 13, a second microphone 14, a first speaker 15, a second speaker 16, a sensing unit 17, and a control unit 18. The electronic device 10 can be used to make a call and can switch between different microphones (e.g. the first microphone 13, and the second microphone 14) according to an orientation of the electronic device 10 (e.g. the screen 12 is facing upward or downward).

The main body 11 includes a first cover 110 and a second cover 111. In this embodiment, the electronic device 10 is a mobile phone. The first cover 110 can be a front cover of the electronic device 10. The second cover 111 can be a rear cover of the electronic device 10. The screen 12 is positioned on the first cover 110. The control unit 18 is positioned inside the main body 11. The first microphone 13 and the second microphone 14 are respectively positioned at two different sides of the electronic device 10. The first microphone 13 and the second speaker 16 are positioned at the same side of the electronic device 10. A working power of the second speaker 16 is greater than that of the first speaker 15. Thus, the second speaker 16 is suitable for making a call in a hand-free mode and the first speaker 15 is suitable for making a call in a normal mode.

The sensing unit 17 includes a light sensor 170, a G-sensor 171, and a camera module 172. In this embodiment, the first microphone 13 and the second speaker 16 are positioned at an end portion of the first cover 110. The first speaker 15 and the light sensor 170 are positioned on the first cover 110. The second microphone 14, the camera module 172 are positioned on the second cover 111. The G-sensor 171 is positioned inside the main body 11 of the electronic device 10. The G-sensor 171 is configured to sense an orientation of the electronic device 10 (e.g. whether the screen 12 or the second cover 111 is facing upward). The light sensor 170 is configured to sense a first light value of the screen 12 and transmit the first light value to the control unit 18 to determine whether the first light value is greater than a first preset value. The camera module 172 is configured to obtain a second light value of the second cover 111 and transmit the second light value to the control unit 18 to determine whether the second light value is greater than a second preset value. In one embodiment, the first preset value may be equal to the second present value. In another embodiment, the first preset value may be different from the second present value.

Figure 3:
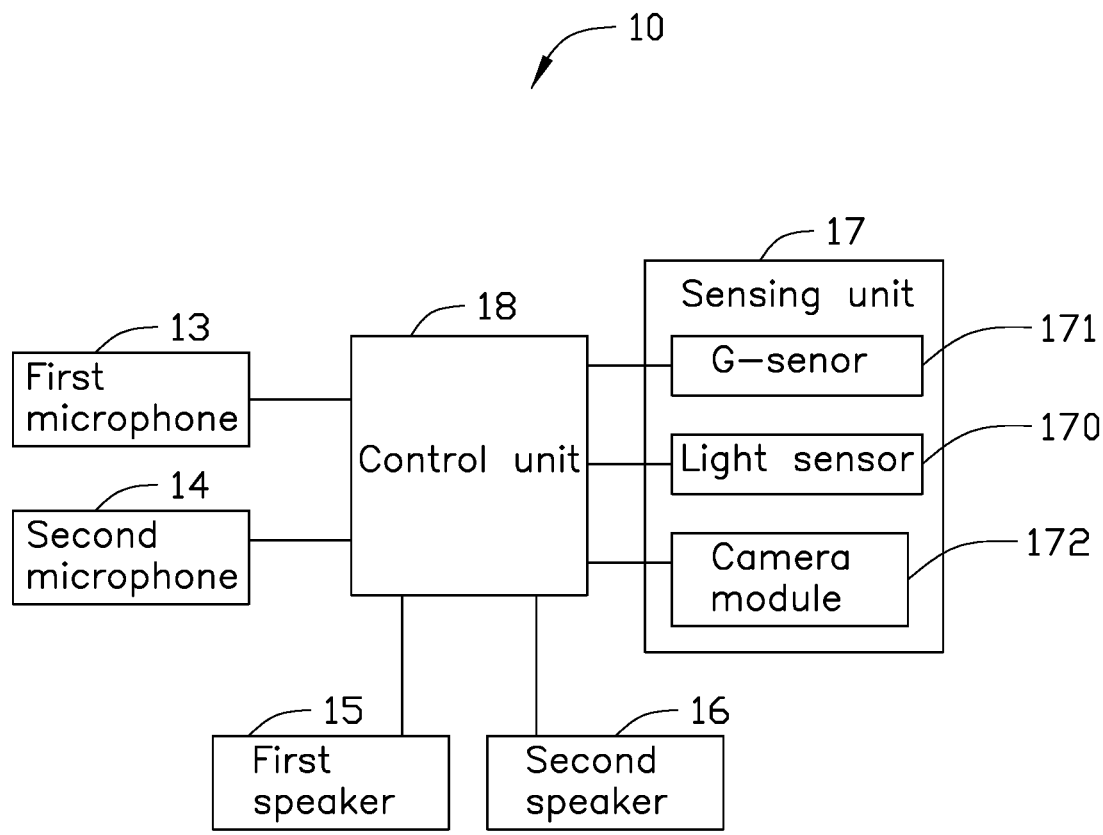
FIG. 3 is a block diagram of one embodiment of the electronic device of FIG. 1.

FIG. 3 illustrates that the control unit 18 is electronically connected to the first microphone 13, a second microphone 14, a first speaker 15, and a second speaker 16, and the sensing unit 17. The control unit 18 is configured to select one of the first microphone 13 and the second microphone 14 to receive audio signals from a user when the user selects one of the normal mode and the hand-free mode to make a call.

In this embodiment, when the normal mode is started by the user, the first speaker 15 works to play audios from the other side of the call, the electronic device 10 is attached to an ear of the user, the control unit 18 controls the first microphone 13 to obtain the audio signals from the user, processes the audio signals, and transmits the processed audio signals to the other side of the call. When the hand-free mode is started by the user, the second speaker 16 works to play the audios from the other side of the call, the electronic device 10 is far away from the ear of the user, the control unit 18 selects one of the first microphone 13 and the second microphone 14 to obtain the audio signal from the user according to the first light value, the orientation of the electronic device 10, and the second light value.

Figure 4:
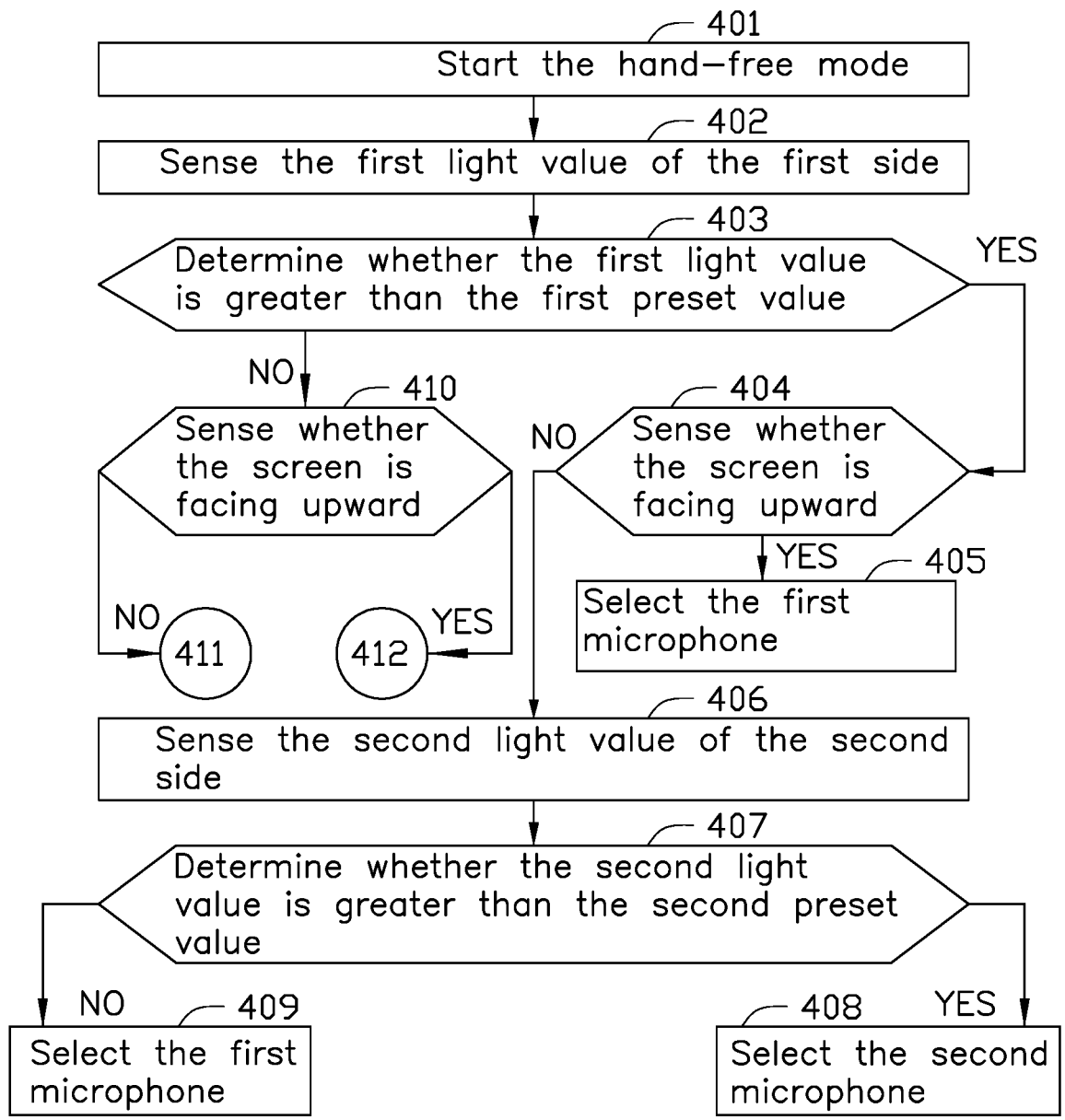
FIGS. 4 and 5 are a flow chart of one embodiment of a microphone switching method using by the electronic device of FIG. 1.
Figure 5:
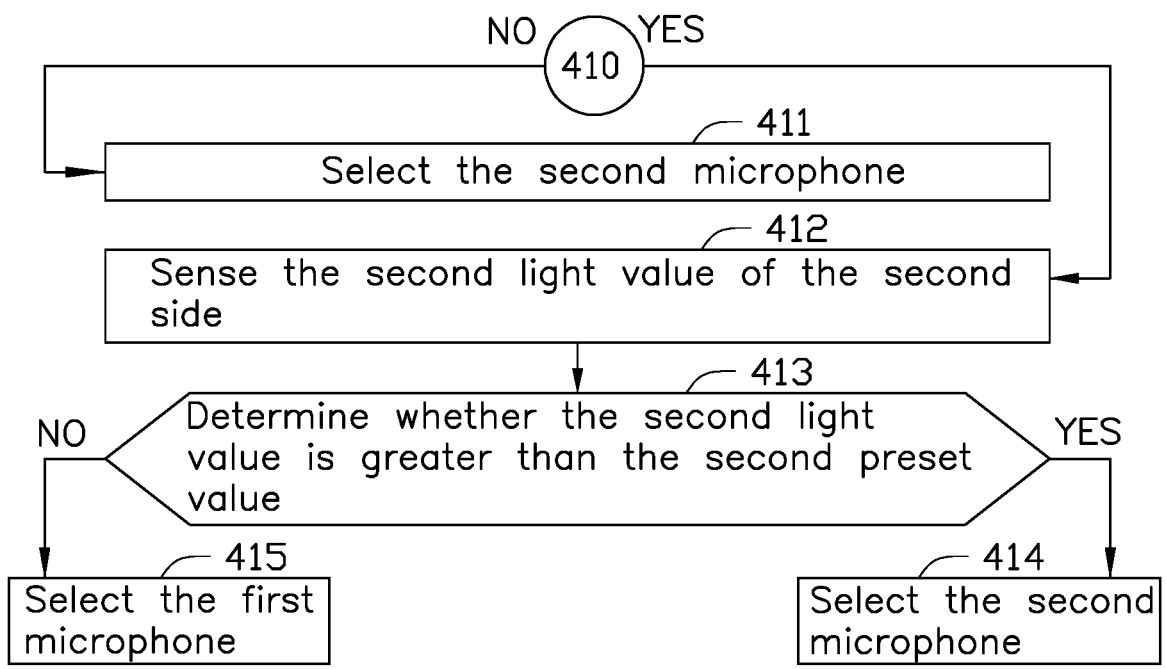

FIGS. 4 and 5 show a flow chart of one embodiment of a microphone switching method using by the electronic device of FIG. 1. When a current mode of the electronic device 10 during calls is the hand free mode, the first microphone 13 and the second microphone 14 are switched as below.

At block 401, the user starts the hand-free mode as the current mode during calls.

At block 402, the light sensor 170 senses the first light value of the screen 12 (the first side of the electronic device 10) and transmits the first light value to the control unit 18.

At block 403, the control unite 18 compares the first light value with the first preset value, if the first light value is greater than the first preset value, the process goes to block 404; otherwise, the process goes to block 410.

At block 404, if the first light value of the screen 12 is greater than the first preset value, the G-sensor 171 senses whether the screen 12 is facing upward. If the G-sensor 171 senses that the screen 12 is facing upward, the process goes to block 405, otherwise, the process goes to block 406.

At block 405, the control unit 18 selects the first microphone 13 to receive the audio signals from the user.

At block 406, the camera module 172 senses the second light value of the second cover 111 (the second side of the electronic device 10) and transmits the second light value to the control unit 18.

At block 407, the control unite 18 compares the second light value with the second preset value, if the second light value is greater than the second preset value, the process goes to block 408; otherwise, the process goes to block 409.

At block 408, if the second light value is greater than the second preset value, that indicates the second cover 111 is not blocked or shielded, the control unit 18 selects the second microphone 14 to receive the audio signals from the user.

At block 409, if the second light value is not greater than the second preset value, that indicates the second cover 111 is blocked or shielded by some object such as a desk, a book, or a wall, the control unite 18 selects the first microphone 13 to receive the audio signals from the user. In this embodiment, a gain of the first microphone 13 received the audio signals is lower than that of the second microphone 14 so that an echo phenomenon can be avoided between the first microphone 13 and the second speaker 16.

At block 410, if the first light value is not greater than the first preset value, that indicates the first side of the electronic device 10 (corresponding to the screen 12) is dark, the G-sensor 171 senses whether the screen 12 is facing upward, if the G-sensor 171 senses the screen 12 is facing downward, and the second cover 111 is facing upward, the process goes to block 411, otherwise, the process goes to block 412.

At block 411, the control unite 18 selects the second microphone 14 to receive the audio signals from the user.

At block 412, if the G-sensor 171 senses the screen 12 is facing upward, that indicates the first side of the electronic device 10 (corresponding to the screen 12) can be blocked or shielded, the camera module 172 senses the second light value of the second cover 111 (the second side of the electronic device 10) and transmits the second light value to the control unit 18.

At block 413, the control unite 18 compares the second light value with the second preset value, if the second light value is greater than the second preset value, the process goes to block 414; otherwise, the process goes to block 415.

At block 414, if the second light value is greater than the second preset value, that indicates the second microphone 14 positioned on the second cover 111 is suitable for receive the audio signals, the control unite 18 selects the second microphone 14 to receive the audio signals from the user.

At block 415, if the second light value is not greater than the second preset value, that indicates the second cover 111 is blocked or shielded and the control unite 18 selects the first microphone 13 to receive the audio signals from the user.

The microphone switching method senses the first light value of the side of the screen 12, the orientation of the electronic device 10, and the second light value of the side of the second cover 111 by the light sensor 170, the G-sensor 171, and the camera module 172, respectively, determines whether one of the side of the screen 12 and the side of the second cover is blocked or shielded according to the first light value, the orientation, and the second light value, and selects one of the first microphone 13 and the second microphone 14 according to the determination. Therefore, when one of the first microphone 13 and the second microphone 14 is blocked, another one of the first microphone 13 and the second microphone 14 can be selected to receive the audio signals from user to maintain a stable volume and better quality of the calls.

It is to be understood, however, that even through numerous characteristics and advantages of the present disclosure have been set forth in the foregoing description, together with details of assembly and function, the disclosure is illustrative only, and changes may be made in details, especially in the matters of shape, size, and arrangement of parts within the principles of the disclosure to the full extent indicated by the broad general meaning of the terms in which the appended claims are expressed.

What is claimed is:

1. An electronic device comprising:
   a first microphone;
   a second microphone, wherein the first and the second microphones are respectively positioned at two different sides of the electronic device;
   a sensing unit, the sensing unit comprising a light sensor, a G-sensor, and a camera module, the light sensor being positioned at a first side of the electronic device and configured to sense a first light value of the first side of the electronic device when a hand-free mode is started for a call, the camera module being positioned at a second side of the electronic device, the G-sensor being positioned inside the electronic device; and
   a control unit configured to compare the first light value with a first preset value,
   wherein the G-sensor is configured to sense an orientation of the electronic device to determine whether the first side faces upwards or downwards when the first light value is greater than the first preset value, wherein
   the control unit is configured to select the first microphone to work if the first side faces upward based on sensing the orientation of the electronic device, and the camera module is configured to sense a second light value of the second side if the first side faces downwards based on sensing the orientation of the electronic device,
   wherein the control unit is further configured to compare the second light value with a second preset value, select the first microphone to work when the second light value is not greater than the second preset value, and select the second microphone to work when the second light value is greater than the second preset value.

2. The electronic device of claim 1, wherein the electronic device further comprises a front cover, a screen positioned on the front cover, and a rear cover assembled to the front cover, the light sensor is positioned at the front cover and configured to sense the first light value of the side of the screen, the camera module is positioned at the rear cover and configured to sense the second light value of the side of the rear cover, the G-sensor is positioned inside the electronic device and configured to sense the orientation of the screen.

3. The electronic device of claim 2, wherein the control unit is electronically connected to the first microphone, the second microphone, a first speaker, a second speaker, and the sensing unit, when a normal mode is started, the first speaker works, the control unit controls the first microphone to obtain audio signals from a user, when a hand-free mode is started, the second speaker works, the control unit selects one of the first microphone and the second microphone to obtain the audio signals from the user according to the first light value, the orientation, and the second light value.

4. The electronic device of claim 1, wherein the G-sensor is further configured to sense the orientation of the electronic device to determine whether the first side faces upward or downward again when the first light value is not greater than the first preset value, and the control unit is further configured to select the second microphone to work when the first side faces downward.

5. The electronic device of claim 4, wherein the camera module is further configured to sense the second light value of the second side again if the first side faces upward, the control unit is further configured to compare the second light value with the second preset value, select the second microphone to work when the second light value is greater than the second preset value, and select the first microphone to work when the second light value is not greater than the second preset value.

6. A microphone switching method for an electronic device, the electronic device comprising a first microphone and a second microphone positioned at two different sides of the electronic device, the method comprising:
sensing a first light value of a first side of the electronic device when a hand-free mode is started for a call;
comparing the first light value with a first preset value;
sensing an orientation of the electronic device to determine whether the first side faces upwards or downwards when the first light value is greater than the first preset value, wherein
selecting the first microphone to work if the first side faces upward based on sensing the orientation of the electronic device, and
sensing a second light value of a second side of the electronic device if the first side faces downwards based on sensing the orientation of the electronic device;
comparing the second light value with a second preset value;
selecting the first microphone to work when the second light value is not greater than the second preset value; and
selecting the second microphone to work when the second light value is greater than the second preset value.

7. The microphone switching method of claim 6, wherein the first side is a side of a screen of the electronic device; the second side is a side of a rear cover of the electronic device.

8. The microphone switching method of claim 7, further comprising:
sensing the orientation of the electronic device to determine whether the screen faces upward or downward again when the first light value is not greater than a first preset value;
selecting the second microphone to work if the screen faces downward;
determining whether the second light value is greater than the second preset value again if the screen faces upward;
selecting the second microphone to work when the second light value is greater than the second preset value; and
selecting the first microphone to work when the second light value is not greater than the second preset value.

* * * * *